May 7, 1935.  H. C. EDWARDS  2,000,635
INTERNAL COMBUSTION ENGINE
Filed Dec. 14, 1931
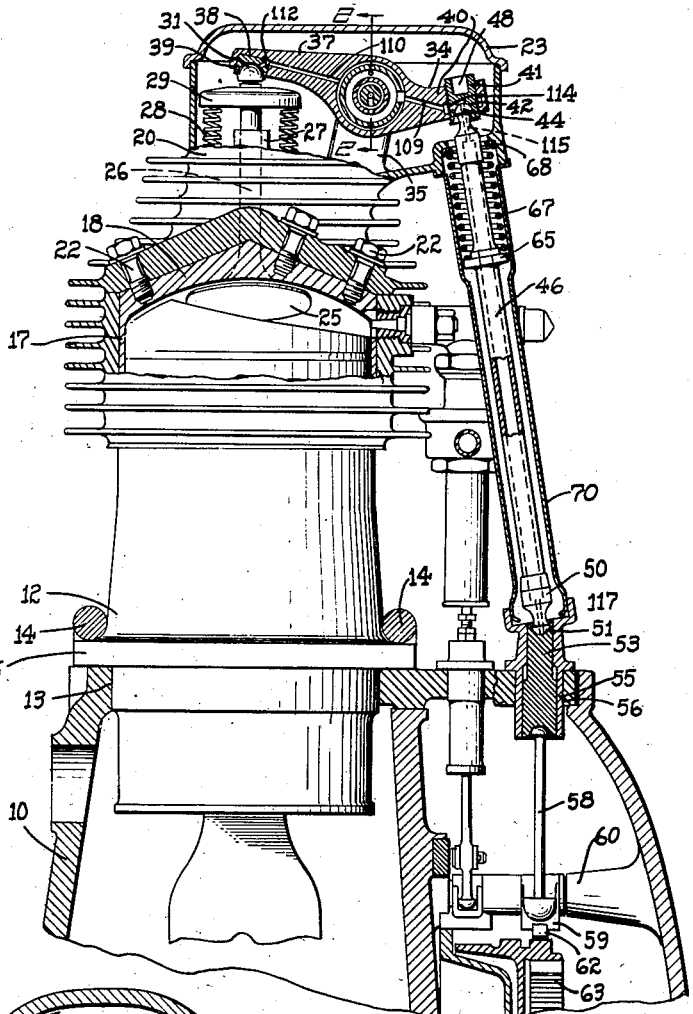
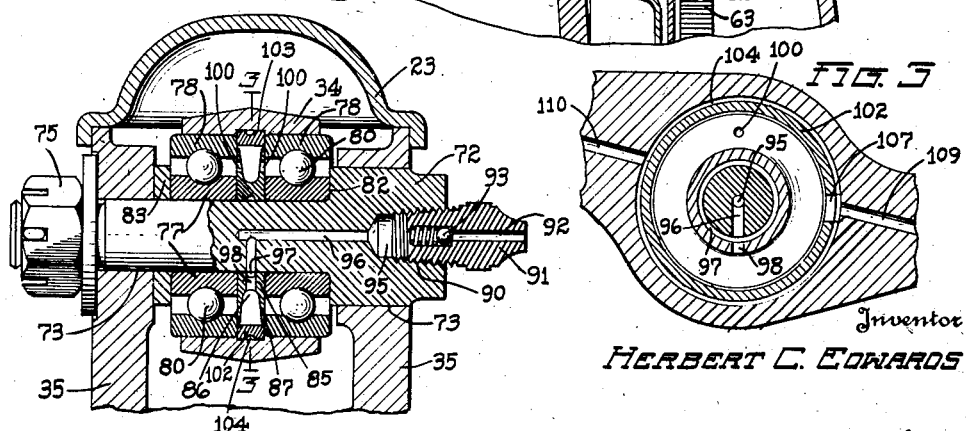
Inventor
HERBERT C. EDWARDS
By Watson, Cort, Morse & Grindle
Attorneys Patented May 7, 1935

2,000,635

UNITED STATES PATENT OFFICE 2,000,635

INTERNAL COMBUSTION ENGINE

Herbert C. Edwards, Detroit, Mich., assignor to Packard Motor Car Company, Detroit, Mich., a corporation of Michigan Application December 14, 1931, Serial No. 580,971

8 Claims. (Cl. 184—6)

This invention relates to internal combustion engines and more particularly to valve actuating mechanism for controlling the flow of combustible mixture and exhaust gas into and out of the cylinders of such engines.

It is an object of the invention to provide means for ensuring adequate lubrication of such portions of the valve actuating mechanism as are located outside or remote from the engine crankcase and thus cannot be adequately lubricated by a splash system. The invention is particularly applicable to the lubrication of valve actuating mechanism for Diesel engines for use in the propulsion of aircraft. Such an engine is disclosed and claimed in the copending application of Woolson, Serial No. 358,899, filed April 29, 1929, the engine shown therein being of the radial type, having nine cylinders disposed radially to the crankshaft, each cylinder having at its outer end a port controlled by a poppet valve. Each of the valves is actuated by mechanism which includes a rocker mounted on the cylinder head, cam actuated means driven from the crankshaft, and a push rod, by means of which the movements of the cam actuated means are communicated to the rocker, and thence to the valve.

By reason of the high speed with which these engines are operated difficulty has been encountered in ensuring adequate lubrication of the bearing portions of the rocker arm and push rod and it is an object of the present invention to provide means whereby these parts may be readily lubricated and retained in well lubricated condition for long periods of time.

A more specific object of the invention is the provision in an internal combustion engine provided with a poppet valve and a rocker arm and push rod for actuating the valve, of a channel for lubricant affording communication between the supporting bearings for the rocker arm, the bearing between the poppet valve and the rocker arm, and the bearings at each end of the push rod which directly engages and oscillates the rocker arm.

A further object of the invention is the provision in a rocker arm having a supporting bearing, of a channel for delivering lubricant outwardly of the arm from the supporting bearing, means whereby lubricant may be fed to this channel and the supporting bearing from a point adjacent the bearing axis, and means for metering the lubricant delivered to the bearing to ensure proper distribution of the lubricant between the bearing and the outwardly extending channel.

Further objects and features of the invention will be apparent from the following description taken in connection with the accompanying drawing, in which Figure 1 is a longitudinal sectional view taken substantially on the axis of a cylinder of an internal combustion engine embodying the invention;

Figure 2 is a section on the line 2—2 of Figure 1; and

Figure 3 is a section on the line 3—3 of Figure 2.

While the invention is specifically described herein to facilitate an understanding of the underlying principles thereof, it will be understood that the scope of the invention is not to be limited thereby but that various changes and alterations in the construction shown are contemplated. For instance, the invention is illustrated as applied to an aircraft Diesel engine for which it is particularly suitable, but the lubrication of other mechanisms of similar construction may be effected in accordance with the teachings of the present invention.

In the drawing the numeral 10 represents the crankcase of the internal combustion engine, the cylinder 12 being seated in a radial opening 13 in the crankcase and being secured in position by tension members 14 engaging a flange 15 on the base of the cylinder. The cylinder is formed with walls 17 and a head 18 integral therewith, a valve box 20 being secured to the cylinder head 18 by bolts 22. A cover 23 is secured to and encloses the upper end of the valve box.

A poppet valve 25 having a stem 26 mounted for reciprocation in a suitable guide 27 formed in the valve box 20 is arranged to control a port in the cylinder head 18 through which a combustible fuel mixture is introduced and exhaust gas is discharged, the valve being normally held in port-closing position by springs 28 acting between a flange 29 carried by the outer end of the valve stem and suitable abutments formed in the valve box 20. Valve stem 26 is formed at its outer end with a substantially spherical bearing surface 31.

A rocker arm comprising a two armed lever 34 is mounted in suitable bearings carried by supporting arms 35 which may conveniently be formed integrally with the valve box 20, the preferred construction of this bearing being shown more clearly in Figures 2 and 3 of the drawing.

The arm 37 of the rocker 34 is provided adjacent one end with a recess 38 in which is seated a bearing member 39 having a substantially spherical bearing surface engaging the bearing surface 31 on the outer end of the valve stem 26. The arm 40 of the rocker 34 is similarly provided adjacent its outer end with a bearing member 41 having a substantially spherical bearing surface 42 therein to receive a bearing head 44 carried by a push rod 46. It will be noted that the bearing member 41 is threaded within the arm 40 of the rocker 34 and is provided with a slot 48 in the outer end thereof to receive a tool whereby adjustment may be effected to ensure the proper engagement of the several parts of the device without appreciable play between the various cooperating bearing surfaces.

At its inner end the push rod 46 is provided with a bearing head 50 similar to the head 44 having a spherical bearing surface 51 formed thereon, the latter seating in the outer end of a thrust member 53 which is slidable within a bushing 55 mounted in an aperture 56 in the crankcase 10. At its inner end the thrust member 53 is engaged by a reciprocating member 58, the inner end of which engages in turn with a lever 59 mounted on a bearing 60 carried by the crankcase 10. The lever 59 is provided with a cam follower portion 62 which engages and is operated by a cam ring 63 suitably mounted in the crankcase and connected with the crankshaft by gearing, the showing of which is omitted for convenience of illustration.

It will be observed that by means of the arrangement thus far described the reciprocating member 58 and the member 53 associated therewith are periodically thrust outwardly by the action of the cam ring 63, this outward motion being communicated to the push rod 46 and thence to the rocker 34 which in turn depresses the valve 25 and opens the port in the cylinder head. Preferably a flanged portion 65 is provided on the push rod 46, the latter being engaged by a coil spring 67 acting against a seat 68 in the valve box 20 to ensure engagement between the cam ring 63 and the follower 62. The push rod is further preferably enclosed in a casing 70 extending between the bushing 55 and the valve box 20 adjacent the upper end of the push rod.

Referring now more particularly to Figures 2 and 3 of the drawing, it will be observed that the rocker 34 oscillates about a spindle 72 passing through apertures 73 in the supporting arms 35, this spindle being threaded at its outer end to receive a nut 75. Ball races comprising inner and outer annular members 77 and 78 adapted to receive balls 80 therebetween are mounted on the spindle 72, the inner members 77 of these races engaging respectively with an annular shoulder 82 on the spindle 72 and a washer 83, the latter being interposed between the races and the adjacent supporting member 35. A spacing member 85 is interposed between the inner member 77 of the races and is formed with an annular groove 86 in the outer peripheral surface thereof to provide annular lips 87 contacting with the outer member 78 of the ball race. Thus when the nut 75 is threaded inwardly on the spindle 72 the inner member 77 of the ball races and the spacer member 85 are clamped firmly in position between the shoulder 82 on the spindle 72 and the washer 83, the outer member 78 of the races being free to rotate.

A threaded recess 90 is provided in one end of the spindle 72 to receive a lubricant filling plug 91, the latter being provided with an aperture 92 therethrough controlled by a spring pressed ball 93 which acts as a valve to prevent outward discharge of lubricant through the plug. The spindle is further formed with a lubricant passage 95 communicating with the recess 90 and with a further passage 96 extending to the outer surface of the spindle and communicating with an annular groove 97 formed in the spacing member 85. The groove 97 in the spacing member communicates with the relatively large annular groove 86 through a passage 98. The lips 87 formed by the annular groove 86 in the spacing member 85 are provided with relatively small apertures 100 affording restricted communication between the groove 86 and the space between the inner and outer members 77 and 78 of the ball races. An annular member 102 is seated in a recess 103 in the rocker 34 and engages the adjacent member 78 of the ball races. The member 102 is provided in its peripheral surface with an annular groove 104 which is in communication with the annular groove 86 and the spacing member 85 through an aperture 107. Passages 109 and 110 formed in the rocker 34 and extending outwardly in the arms 40 and 37 respectively of the rocker communicate with the annular groove 104 in the member 102.

From the arrangement thus far described it will be apparent that lubricant, for instance in the form of grease, may be supplied through the filling plug 91 to the annular groove 86 in the spacing member 85, which constitutes a lubricant chamber, and the pressure with which this lubricant is introduced will serve to force the relatively thin lips 87 of the spacing member into intimate contact with the outer member 78 of the ball race, thus effectively sealing the space between the inner and outer members of the race so that any lubricant delivered into this space must pass through the apertures 100. Since these apertures are comparatively small, the lubricant delivered to the supporting bearing for the rocker is effectively metered and the supply is properly proportioned between this bearing and the bearings at the outer ends of the arms 37 and 40 of the rocker which are supplied with lubricant from the annular groove 86 in the spacing member 85, through the aperture 107, groove 104, and passages 109 and 110 in the rocker.

The passage 110 in the arm 37 of the rocker 34 communicates with a passage 112 in the bearing member 39 carried by the outer end of the arm, and lubricant is thus delivered to the bearing head 31 of the valve 25. Similarly the passage 109 communicates with a passage 114 through the bearing member 41 carried in the arm 40 to lubricate the bearing surface 42 at the outer end of the push rod 46. It will be observed that the passage 114 communicates with a passage 115 extending through the head 44 of the push rod 46, the latter being of tubular construction so that the lubricant passes through the push rod and is discharged through an aperture 117 in the head 50 at the inner end of the push rod to the bearing surface 51.

It will be appreciated that by this construction the points of contact between the valve stem 26, the rocker 34, the push rod 46, and the member 53 may be effectively lubricated by supplying lubricant under pressure to the single lubricant plug 91, it being possible to lubricate the parts while the engine is in operation. Furthermore, the supply of lubricant to the various bearing surfaces is so controlled that the delivery of an excessive amount of lubricant at any given point is prevented and loss or waste of lubricant is thus eliminated.

Having thus described the invention, what is claimed as new and desired to be secured by Letters Patent is:

1. In an internal combustion engine, the combination with a valve, of a push rod, a rocker engaging and operatively connecting said valve and push rod, bearing means including anti-friction rollers for pivotally supporting said rocker, and a mounting for said bearing means, said rocker being formed with lubricant channels having uninterrupted communication with said valve and push rod, said mounting having a supply passage for lubricant therein communicating with said channels and having relatively restricted communication with said bearing means.

2. In apparatus of the class described, the combination with a lever, of a fulcrum for said lever, said fulcrum comprising a pair of anti-friction bearings each including an inner and an outer race, a spacing member interposed between said inner races and having a groove in the periphery thereof constituting a chamber for lubricant, the walls defining said groove contacting with the adjacent outer races and being apertured to permit the delivery of lubricant from said chamber between the cooperating inner and outer races.

3. In apparatus of the class described, the combination with a lever, of a fulcrum for said lever, said fulcrum comprising a pair of anti-friction bearings each including an inner and an outer race, a spacing member interposed between said inner races and having a groove in the periphery thereof constituting a chamber for lubricant, the walls defining said groove contacting with the adjacent outer races and being apertured to permit the delivery of lubricant from said chamber between the cooperating inner and outer races, said lever being provided with a passage for supplying lubricant to a point thereon spaced from the fulcrum, said passage communicating with said lubricant chamber, said walls being relatively thin to permit flexing thereof into intimate engagement with the outer races in response to pressure of lubricant within said chamber.

4. In apparatus of the class described, the combination with a lever, of a fulcrum for said lever, said fulcrum comprising a pair of anti-friction bearings each including an inner and an outer race, a spacing member interposed between said inner races and having a groove in the periphery thereof constituting a chamber for lubricant, the walls defining said groove contacting with the adjacent outer races and being apertured to permit the delivery of lubricant from said chamber between the cooperating inner and outer races, said lever being provided with a passage for supplying lubricant to a point thereon spaced from the fulcrum, said passage communicating with said lubricant chamber.

5. The combination of a pair of anti-friction bearings each including an inner and an outer race, a spacing member interposed between said inner races and having a groove in the periphery thereof constituting a chamber for lubricant, the walls defining said groove contacting with the adjacent outer races and being apertured to permit the delivery of lubricant from said chamber between the cooperating inner and outer races.

6. The combination with a spindle, of a member surrounding said spindle, a pair of anti-friction devices interposed between said member and spindle, each of said devices including an inner race, an outer race, and rolling elements between said races, an annular spacing means surrounding said spindle and interposed between said inner races, said means having a lubricant chamber formed therein, the walls of said chamber being apertured to permit discharge of lubricant from said chamber to said rolling elements and being relatively flexible, whereby the pressure of lubricant within said chamber may flex said walls into intimate engagement with said outer races, said member being provided with a passage for supplying lubricant to a point thereon spaced from the anti-friction device, said passage communicating with said lubricant chamber.

7. The combination with a spindle, of a member surrounding said spindle, a pair of anti-friction devices interposed between said member and spindle, each of said devices including an inner race, an outer race, and rolling elements between said races, an annular spacing means surrounding said spindle and interposed between said inner races, said means having a lubricant chamber formed therein, the walls of said chamber being apertured to permit discharge of lubricant from said chamber to said rolling elements and being relatively flexible, whereby the pressure of lubricant within said chamber may flex said walls into intimate engagement with said outer races, and a lubricant passage in said member communicating with said chamber between said outer races for supplying lubricant to a second point on said member.

8. The combination with a spindle, of a member surrounding said spindle, a pair of anti-friction devices interposed between said member and spindle, each of said devices including an inner race, an outer race, and rolling elements between said races, an annular spacing means surrounding said spindle and interposed between said inner races, said means having a lubricant chamber formed therein, the walls of said chamber being apertured to permit discharge of lubricant from said chamber to said rolling elements and being relatively flexible, whereby the pressure of lubricant within said chamber may flex said walls into intimate engagement with said outer races, and a supply passage for lubricant extending through said spindle and communicating with said chamber, said member being provided with a passage for supplying lubricant to a point thereon spaced from the anti-friction device, said passage communicating with said lubricant chamber.

HERBERT C. EDWARDS.